(12) United States Patent
Akhtar et al.

(10) Patent No.: US 9,920,739 B2
(45) Date of Patent: Mar. 20, 2018

(54) SYSTEM AND METHOD FOR SECURING A CONDUCTIVE CABLE WITHIN A WIND TURBINE ROTOR BLADE

(71) Applicant: General Electric Company, Schenectady, NY (US)

(72) Inventors: Afroz Akhtar, Bangalore (IN); Venkateswara Rao Kavala, Bangalore (IN); Parnasree Maiti, Bangalore (IN)

(73) Assignee: General Electric Company, Schenectady, NY (US)

( * ) Notice: Subject to any disclaimer, the term of this patent is extended or adjusted under 35 U.S.C. 154(b) by 397 days.

(21) Appl. No.: 14/574,532

(22) Filed: Dec. 18, 2014

(65) Prior Publication Data
US 2016/0177926 A1    Jun. 23, 2016

(51) Int. Cl.
| | |
|---|---|
| *F03D 1/00* | (2006.01) |
| *F03D 1/06* | (2006.01) |
| *F03D 80/30* | (2016.01) |
| *F03D 13/10* | (2016.01) |

(52) U.S. Cl.
CPC .......... *F03D 1/001* (2013.01); *F03D 1/0675* (2013.01); *F03D 13/10* (2016.05); *F03D 80/30* (2016.05); *Y02E 10/721* (2013.01)

(58) Field of Classification Search
CPC ....................................................... F03D 80/30
See application file for complete search history.

(56) References Cited

U.S. PATENT DOCUMENTS

| | | | | |
|---|---|---|---|---|
| 2,173,717 | A * | 9/1939 | Hobart ................ | H01B 9/0672 |
| | | | | 174/15.6 |
| 8,622,710 | B2 | 1/2014 | Rindt et al. | |
| 8,734,110 | B2 * | 5/2014 | Kuroiwa ................ | F03D 80/30 |
| | | | | 416/146 R |
| 2011/0243737 | A1 * | 10/2011 | Bell ........................ | F03D 1/06 |
| | | | | 416/146 R |

FOREIGN PATENT DOCUMENTS

CN          201810500 U       4/2011

* cited by examiner

*Primary Examiner* — Woody Lee, Jr.
*Assistant Examiner* — Hoon Choi
(74) *Attorney, Agent, or Firm* — Dority & Manning, P.A.

(57) ABSTRACT

The present disclosure is directed to a system and method for securing a lightning protection cable (e.g. a conductor) of a lightning protection system within a wind turbine rotor blade. The lightning protection system includes a plurality of lightning receptors configured along either or both of the pressure or suction sides of the rotor blade. The lightning receptors are connected via the conductor so as to form a conductive circuit. Further, a cover assembly defining a passageway therethrough is configured to receive at least a portion of the conductor along a length thereof. Thus, the cover assembly can be secured to an inner surface of the internal cavity so as to maintain a location of the conductor. Accordingly, the conductor is free to move within the cover assembly since the wire is not directly attached to the rotor blade.

17 Claims, 10 Drawing Sheets

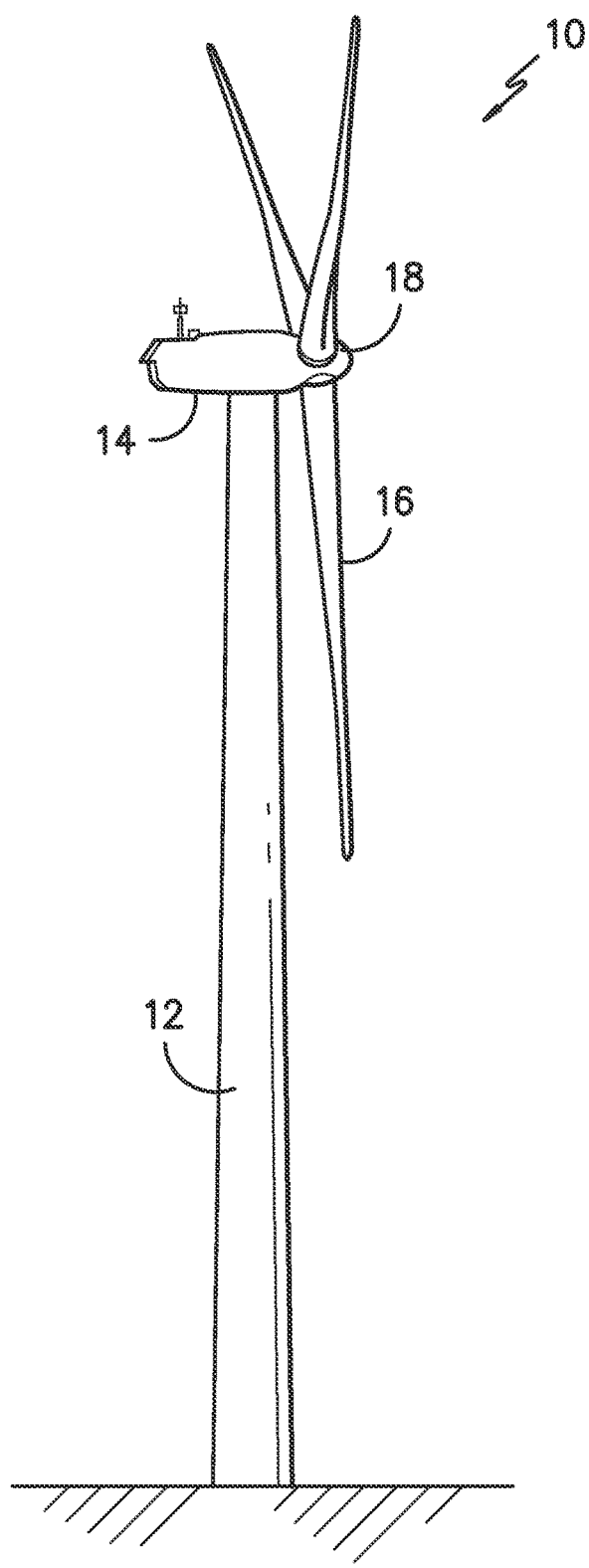
FIG. -1-

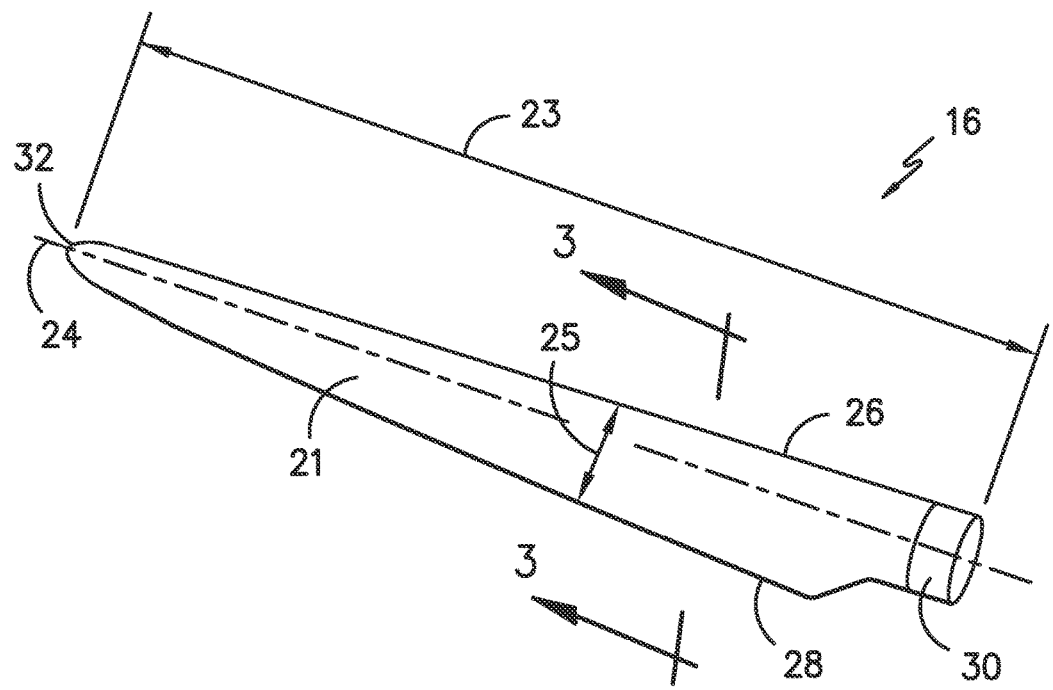
FIG. -2-
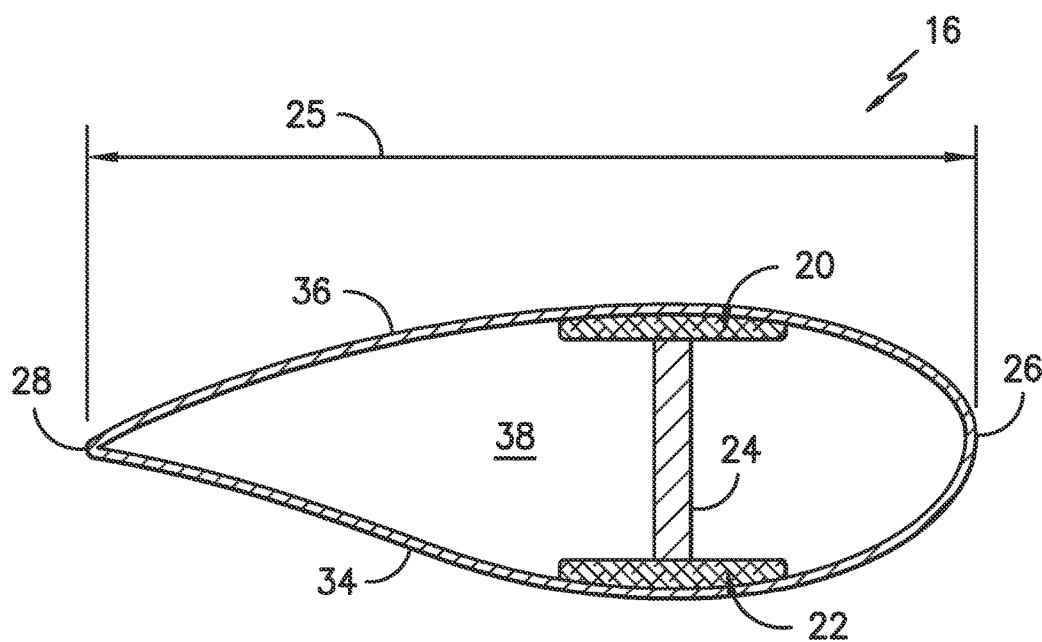
FIG. -3-

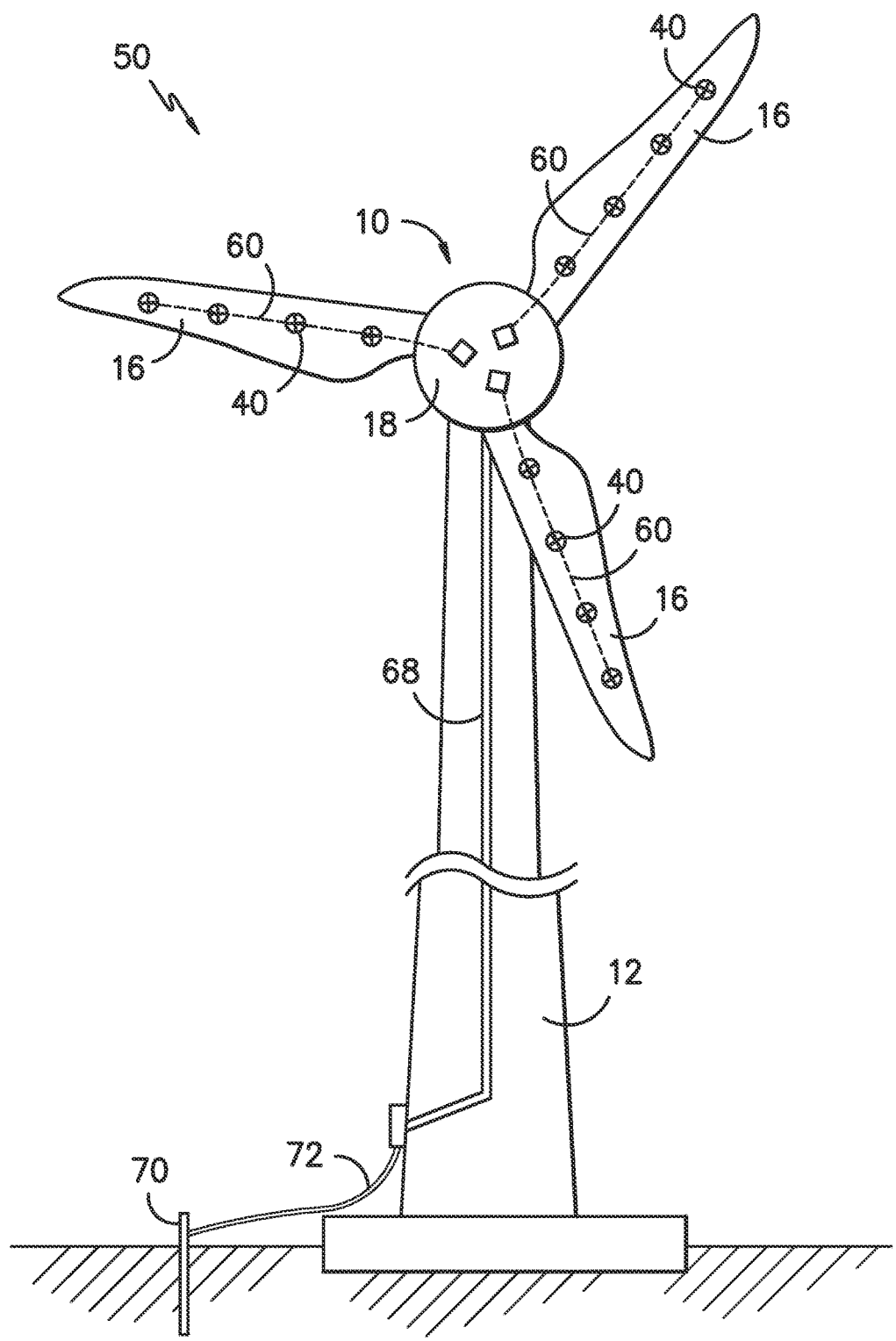
FIG. -4-

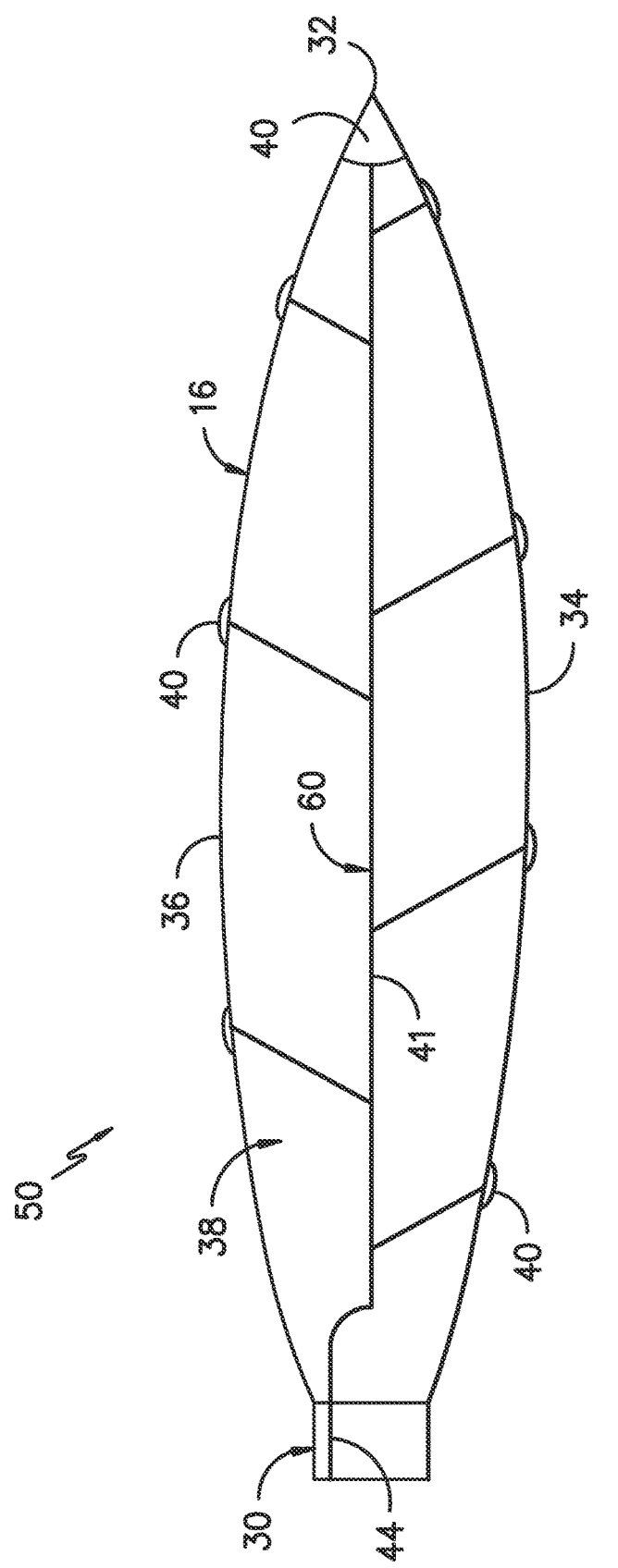
FIG. -5-

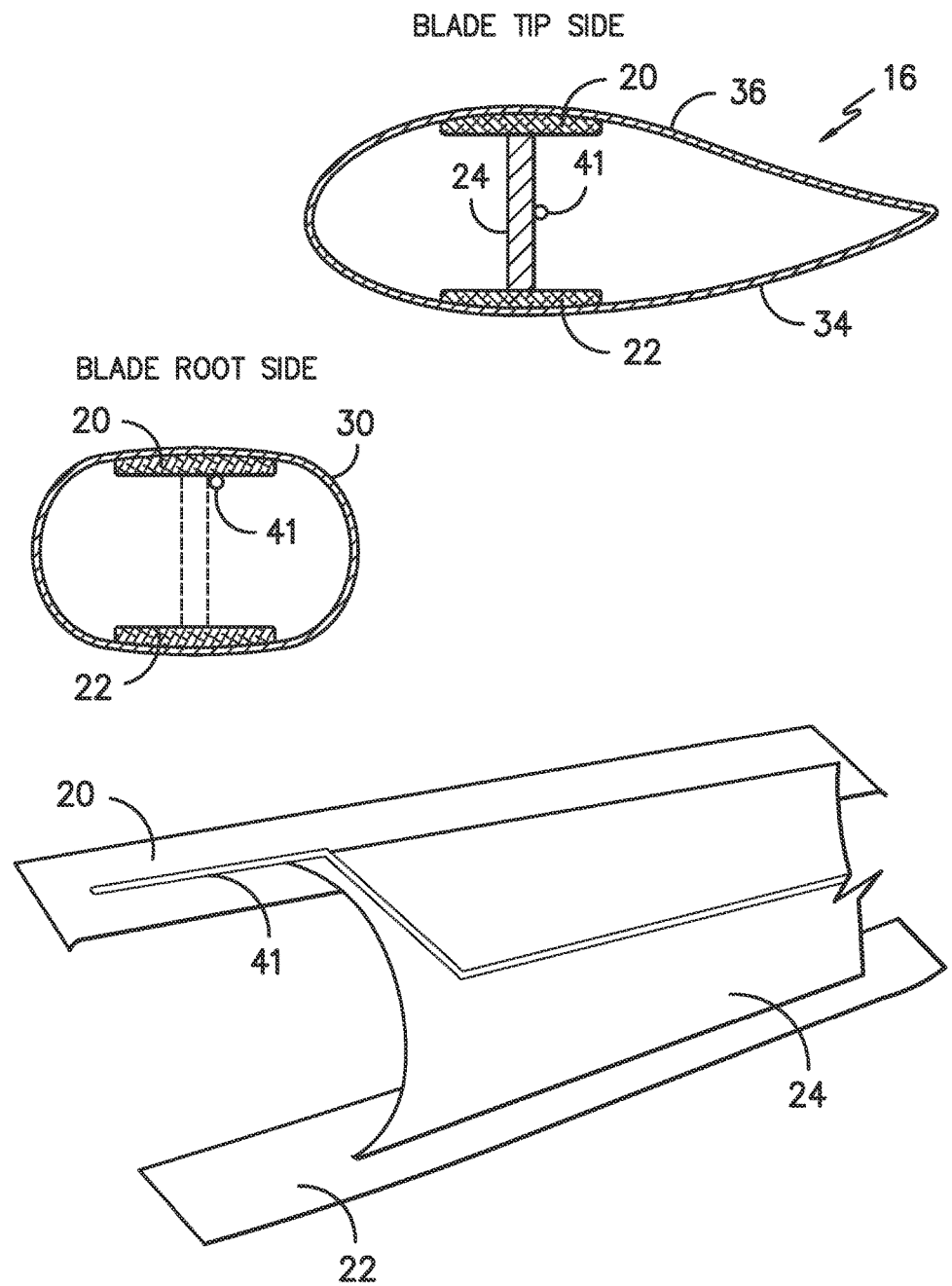
FIG. -6-

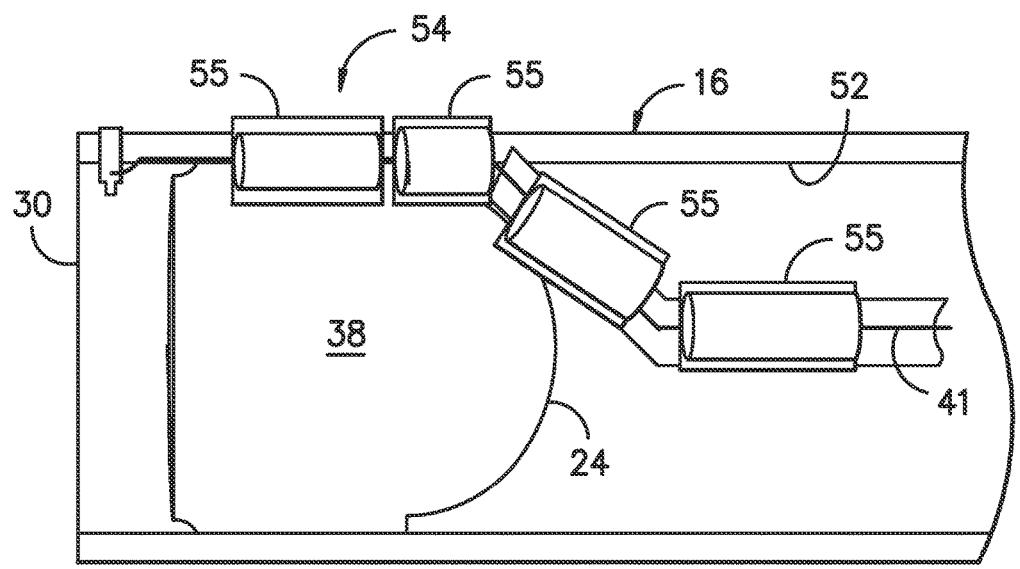
FIG. -7-
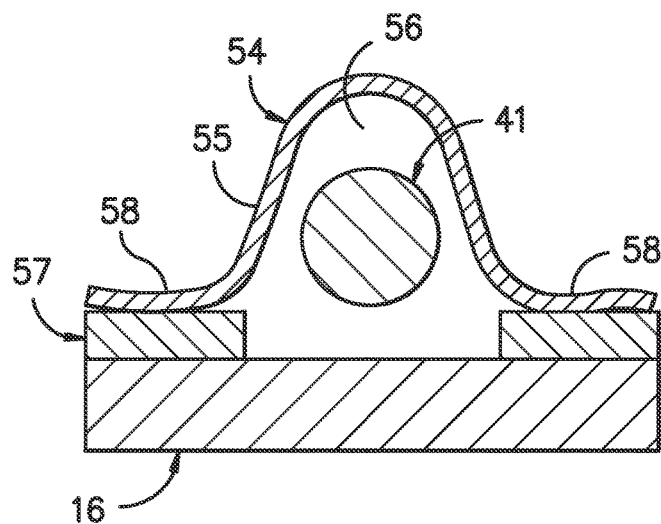
FIG. -8-

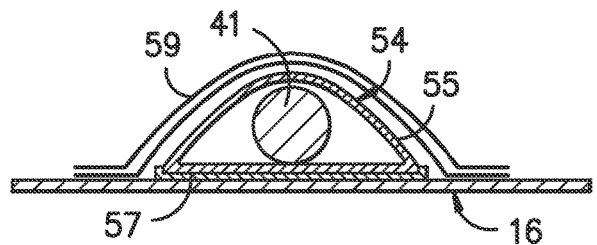
FIG. -9-
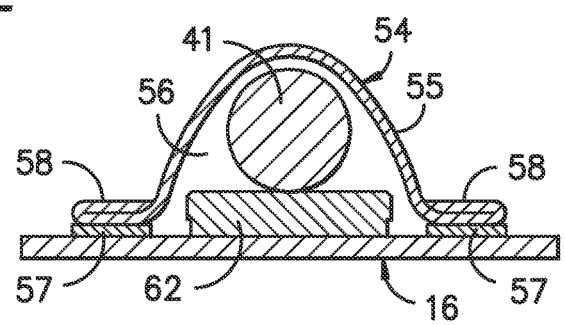
FIG. -10-
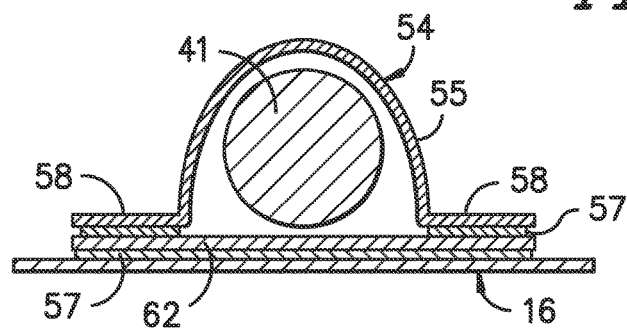
FIG. -11-
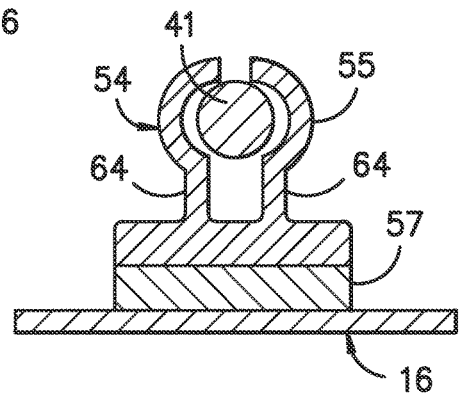
FIG. -12-

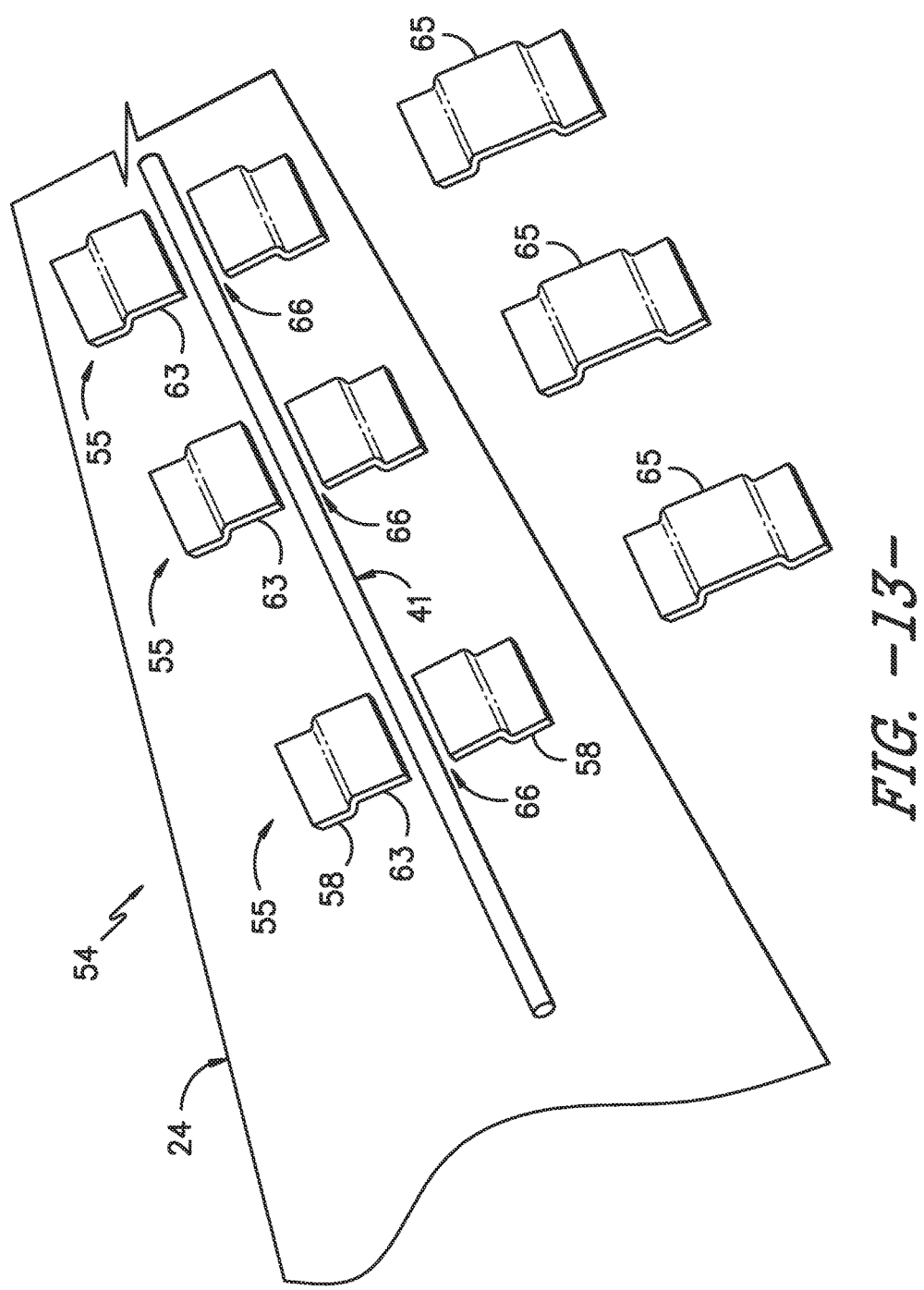

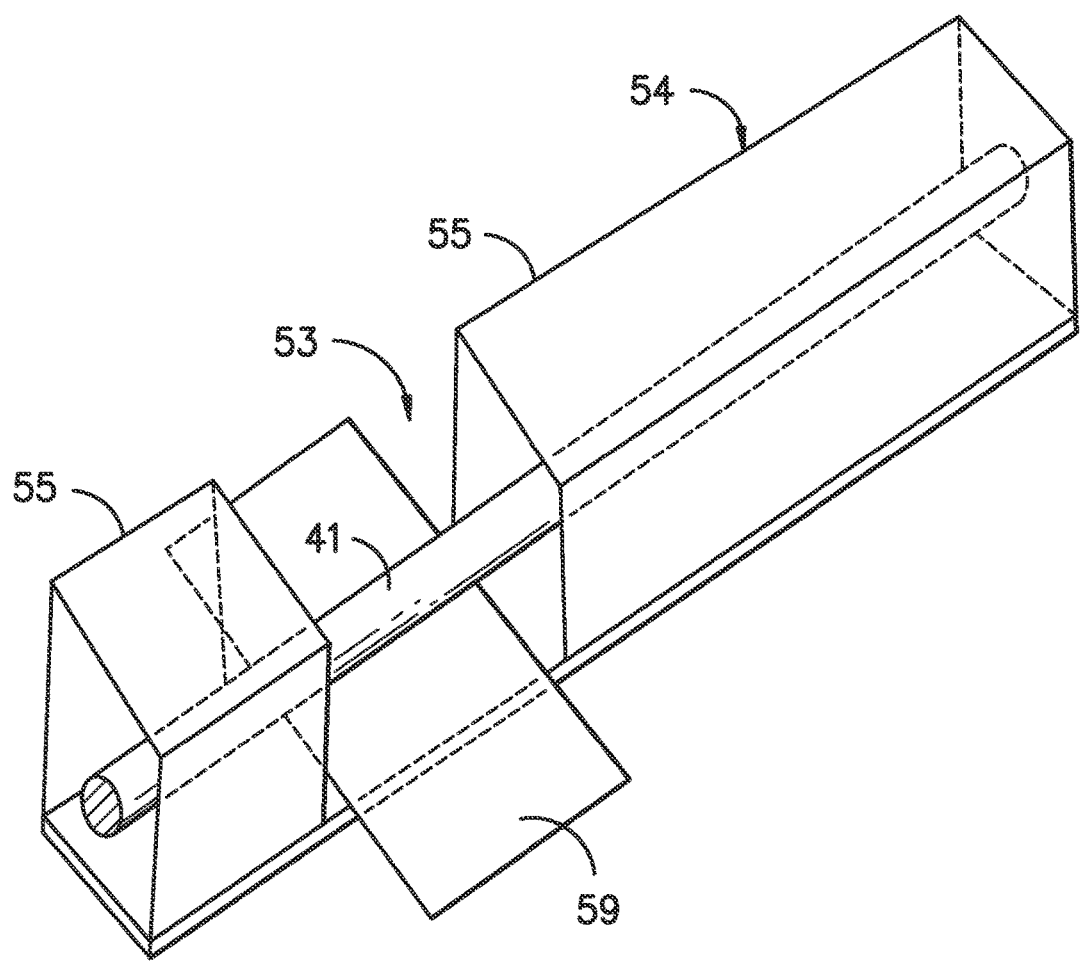
FIG. -14-

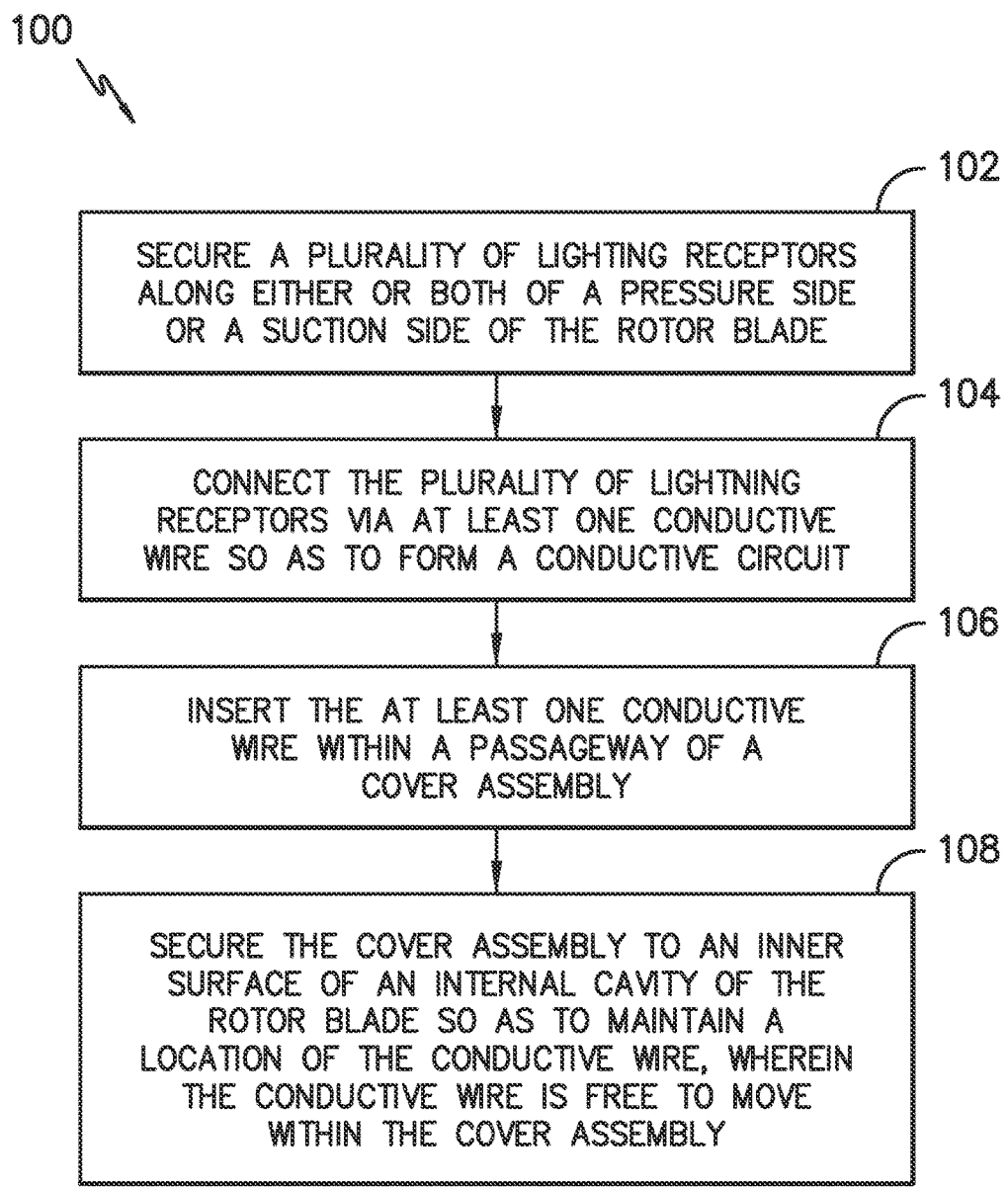
FIG. -15-

# SYSTEM AND METHOD FOR SECURING A CONDUCTIVE CABLE WITHIN A WIND TURBINE ROTOR BLADE

FIELD OF THE INVENTION

The present subject matter relates generally to wind turbines and, more particularly, to a system and method for securing a conductor, e.g. a cable or wire, within a rotor blade of a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

As is generally known, wind turbines typically include a lightning protection system having one or more lightning receptors disposed on the exterior of the rotor blades and a lightning conductor or cable wire coupled to the lightning receptor(s) and extending through the rotor blades from a blade tip to the blade root and down through the tower to a ground location. Thus, when lightning strikes the rotor blade, the electrical current may flow through the lightning receptor and may be conducted through the lightning conductor to the ground.

The lightning conductor is typically attached directly to the blade using fiberglass laminates and bond paste. Thus, stresses and strains experienced by the rotor blade pass directly to the lightning conductor. Such stresses and strains can cause damage and/or breakage to the conductor, thereby requiring immediate repair to ensure the lightning protection system remains operable.

Accordingly, there is a need for improved and effective systems and methods for securing the conductor of the lighting protection system to a rotor blade of a wind turbine.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a wind turbine rotor blade. The rotor blade includes a root, a tip, and pressure and suction sides extending between the tip and the root. The pressure and suction sides define an internal cavity therebetween. A plurality of lightning receptors are configured along either or both of the pressure or suction sides. At least one conductor, e.g. a cable or wire, connects the plurality of lightning receptors so as to form a conductive circuit. Further, a cover assembly defining a passageway therethrough is configured to receive at least a portion of the conductor along a length thereof. Thus, the cover assembly can be secured to an inner surface of the internal cavity of the rotor blade so as to maintain a location of the conductor. Accordingly, the conductor is free to move within the cover assembly and is not directly secured to the rotor blade.

In one embodiment, the cover assembly may include one or more cover members. Further, the cover members may include any suitable cross-sectional profile so as to receive the conductor therein. For example, in certain embodiments, the cover members may include at least one of the following cross-sectional profiles: omega-shaped, square, elliptical, U-shaped, C-shaped, L-shaped, triangular, rectangular, round, or similar or any combinations thereof. In additional embodiments, one or more of the cover members may include one or more flanges configured for attaching the cover members to the inner surface of the internal cavity. More specifically, in several embodiments, the flanges may be bonded to the inner surface via at least one of an adhesive or a fastener configured between the one or more flanges and the inner surface of the internal cavity.

In another embodiment, the rotor blade may include a bonding material configured atop the cover assembly so as to further secure the cover assembly to the rotor blade. For example, in a particular embodiment, the bonding material may include at least one of fiberglass laminates, an adhesive, or similar.

In further embodiments, at least a portion of the conductor may be configured with a shear web of the rotor blade. In such an embodiment, the cover assembly may be located between the blade root and an end of the shear web.

In still additional embodiments, the cover assembly may include a dampening material configured between the portion of the conductor within the passageway of the cover assembly and the inner surface of the internal cavity of the rotor blade. In addition, the cover assembly may include a dampening material configured between the individual cover members.

In yet another embodiment, the conductive circuit may include terminal ends that extend through the root and connect to a grounding system.

In another aspect, the present disclosure is directed to a system for securing a conductor within a rotor blade of a wind turbine. The system includes at least one conductor and a cover assembly configured to receive at least a portion of the conductor along a length thereof. The cover assembly is configured to receive at least a portion of the conductor along a length thereof. Thus, the cover assembly is configured for attachment to an inner surface of the rotor blade so as to maintain a location of the conductor. Accordingly, the conductor is free to move within the cover assembly when installed because the wire is not directly secured to the rotor blade. It should be understood that the lightning protection system may also include any of the additional feature as described herein.

In yet another aspect, the present disclosure is directed to a method for installing a lightning protection system of a wind turbine. The method includes securing a plurality of lightning receptors along either or both of a pressure side or a suction side of a rotor blade of the wind turbine. Another step includes connecting the plurality of lightning receptors via at least one conductor so as to form a conductive circuit. The method also includes inserting the conductor within a passageway of a cover assembly. Further, the method includes securing the cover assembly to an inner surface of an internal cavity of the rotor blade so as to maintain a location of the conductor. Thus, the conductor is free to move within the cover assembly when installed because the wire is not directly secured to the rotor blade. It should be understood that the method may also include any of the additional steps and/or feature as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a conventional wind turbine;

FIG. 2 illustrates a perspective view of a conventional rotor blade;

FIG. 3 illustrates a cross-sectional view of the rotor blade of FIG. 2 along line 3-3;

FIG. 4 illustrates a perspective view of one embodiment of a wind turbine, particularly illustrating a lighting protection system configured thereon according to the present disclosure;

FIG. 5 illustrates a perspective view of one embodiment of a rotor blade, particularly illustrating a plurality of lighting receptors connected by a conductor according to the present disclosure;

FIG. 6 illustrates a perspective view of one embodiment of various internal components of a rotor blade, particularly illustrating a conductor configured with a shear web according to the present disclosure;

FIG. 7 illustrates a side view of one embodiment of a rotor blade near the blade root, particularly illustrating a cover assembly configured with a conductor according to the present disclosure;

FIG. 8 illustrates a cross-sectional view of one embodiment of a cover assembly configured with a conductor according to the present disclosure;

FIG. 9 illustrates a cross-sectional view of another embodiment of a cover assembly configured with a conductor according to the present disclosure;

FIG. 10 illustrates a cross-sectional view of still another embodiment of a cover assembly configured with a conductor according to the present disclosure;

FIG. 11 illustrates a cross-sectional view of yet another embodiment of a cover assembly configured with a conductor according to the present disclosure;

FIG. 12 illustrates a cross-sectional view of still another embodiment of a cover assembly configured with a conductor according to the present disclosure;

FIG. 13 illustrates a perspective view of another embodiment of a cover assembly configured with a conductor according to the present disclosure;

FIG. 14 illustrates a cross-sectional view of an additional embodiment of a cover assembly configured with a conductor according to the present disclosure; and FIG. 15 illustrates a flow diagram of one embodiment of a method for installing a lightning protection system of a wind turbine according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to improved systems and method for securing a conductor (e.g. a lightning conductor, an electrical power cable, a health monitoring cable, or similar) within a rotor blade of a wind turbine. For example, in one embodiment, a lightning conductor of a lightning protection system of a wind turbine connects a plurality of lightning receptors so as to form a conductive circuit. Further, a cover assembly defining a passageway therethrough is configured to receive at least a portion of the conductor along a length thereof. Thus, the cover assembly can be secured to an inner surface of the rotor blade so as to maintain a location of the conductor. Accordingly, the conductor is free to move within the passageway of the cover assembly and is not directly secured to the rotor blade.

By securing the cover assembly to the rotor blade rather than the conductor, the present disclosure is configured to reduce deflection and/or strain transfer between the rotor blade and the conductor. Thus, the stresses and strains experienced by the rotor blade will not pass to the lightning cable. Accordingly, the life of the cable is increased under fatigue loading.

Referring to the drawings, FIG. 1 illustrates a perspective view of a horizontal axis wind turbine 10. It should be appreciated that the wind turbine 10 may also be a vertical-axis wind turbine. As shown in the illustrated embodiment, the wind turbine 10 includes a tower 12, a nacelle 14 mounted on the tower 12, and a rotor hub 18 that is coupled to the nacelle 14. The tower 12 may be fabricated from tubular steel or other suitable material. The rotor hub 18 includes one or more rotor blades 16 coupled to and extending radially outward from the hub 18. As shown, the rotor hub 18 includes three rotor blades 16. However, in an alternative embodiment, the rotor hub 18 may include more or less than three rotor blades 16. The rotor blades 16 rotate the rotor hub 18 to enable kinetic energy to be transferred from the wind into usable mechanical energy, and subsequently, electrical energy. Specifically, the hub 18 may be rotatably coupled to an electric generator (not illustrated) positioned within the nacelle 14 for production of electrical energy.

Referring now to FIGS. 2 and 3, one embodiment of a rotor blade 16 for use with a wind turbine 10 is illustrated in accordance with aspects of the present subject matter. In particular, FIG. 2 illustrates a perspective view of one embodiment of the rotor blade 16. FIG. 3 illustrates a cross-sectional view of the rotor blade 16 along the sectional line 3-3 shown in FIG. 2. As shown, the rotor blade 16 generally includes a blade root 30 configured to be mounted or otherwise secured to the hub 18 (FIG. 1) of a wind turbine 10 and a blade tip 32 disposed opposite the blade root 30. A body shell 21 of the rotor blade generally extends between the blade root 30 and the blade tip 32 along a longitudinal axis 27. The body shell 21 may generally serve as the outer casing/covering of the rotor blade 16 and may define a substantially aerodynamic profile, such as by defining a symmetrical or cambered airfoil-shaped cross-section. The body shell 21 may also define a pressure side 34 and a suction side 36 extending between leading and trailing edges 26, 28 of the rotor blade 16. Further, the rotor blade 16 may also have a span 23 defining the total length between the blade root 30 and the blade tip 32 and a chord 25 defining the total length between the leading edge 26 and the trialing edge 28. As is generally understood, the chord 25 may generally vary in length with respect to the span 23 as the rotor blade 16 extends from the blade root 30 to the blade tip 32.

In several embodiments, the body shell 21 of the rotor blade 16 may be formed as a single, unitary component. Alternatively, the body shell 21 may be formed from a plurality of shell components. For example, the body shell 21 may be manufactured from a first shell half generally defining the pressure side 34 of the rotor blade 16 and a second shell half generally defining the suction side 36 of the rotor blade 16, with such shell halves being secured to one another at the leading and trailing edges 26, 28 of the blade 16. Additionally, the body shell 21 may generally be formed from any suitable material. For instance, in one embodiment, the body shell 21 may be formed entirely from a laminate composite material, such as a carbon fiber reinforced laminate composite or a glass fiber reinforced laminate composite. Alternatively, one or more portions of the body shell 21 may be configured as a layered construction and may include a core material, formed from a lightweight material such as wood (e.g., balsa), foam (e.g., extruded polystyrene foam) or a combination of such materials, disposed between layers of laminate composite material.

Referring particularly to FIG. 3, the rotor blade 16 may also include one or more longitudinally extending structural components configured to provide increased stiffness, buckling resistance and/or strength to the rotor blade 16. For example, the rotor blade 16 may include a pair of longitudinally extending spar caps 20, 22 configured to be engaged against the opposing inner surfaces of the pressure and suction sides 34, 36 of the rotor blade 16, respectively. Additionally, one or more shear webs 24 may be disposed between the spar caps 20, 22 so as to form a beam-like configuration. The spar caps 20, 22 may generally be designed to control the bending stresses and/or other loads acting on the rotor blade 16 in a generally spanwise direction (a direction parallel to the span 23 of the rotor blade 16) during operation of a wind turbine 10. Similarly, the spar caps 20, 22 may also be designed to withstand the spanwise compression occurring during operation of the wind turbine 10.

Referring now to FIG. 4, a perspective view of one embodiment of a wind turbine 10 having a lightning protection system 50 configured thereon is illustrated. As shown, the lightning protection system 50 includes at least one rotor blade 16 having a plurality of lightning receptors 40 configured along either or both pressure or suction sides 34, 36 of the blade 16. Further, each of the rotor blades 16 is configured in a similar manner. For example, as shown, each rotor blade 16 includes a conductive circuit 60 having a plurality of lightning receptors 40 connected via one or more lightning conductors or conductive wires 41 within the internal cavity of the rotor blade 16. The respective lightning conductive circuits 60 for each of the rotor blades 16 include terminal ends that extend through the root portion of the rotor blades 16 and are individually connected to a grounding system within the rotor hub 18. The grounding system may be variously configured, as is well known in the art. For example, the grounding system may include any conductive path defined by the wind turbine's machinery or support structure, including blade bearings, machinery bed plates, tower structure, and the like, that defines any suitable ground conductive path 68 from the blades 16, through the tower 12, to a ground rod 70 via a ground cable 72, or other suitable electrical ground path.

Referring now to FIG. 5, a cross-sectional view of one embodiment of a rotor blade 16 having a lightning protection system 50 configured therewith is illustrated. As shown, the lightning protection system 50 includes a conductive circuit 60 illustrated within the internal cavity 38 of the rotor blade 16. In other embodiments, the conductive circuit 60 may be defined by components that are embedded in the blade 16, or are external to the blade 16, for example along the outer surfaces of the blade 16. More specifically, as shown, the conductive circuit 60 includes a plurality of lightning receptors 40 connected via one or more conductors 41. In various embodiments, the lightning receptors 40 may be configured along either or both of the pressure or suction sides 36, 34. For example, in the illustrated embodiment, the lightning receptors 40 are provided on each of the pressure and suction sides 36, 34. In an alternative embodiment, the lightning receptors 40 may be provided on only one of the sides 36, 34. It should be understood that the lightning receptors 40 may be variously configured within the scope and spirit of the invention, and may include any metal or metalized component (i.e., a metal screen, a metal rod or tip, and the like) mounted on the pressure or suction sides 36, 34 of the rotor blade 16 for the purpose of conducting lightning strikes to a ground. Further, the conductor(s) 41 may have a gauge suitable for defining a conductive leg for transmitting a lightning strike on any one of the receptors 40 to a ground via connection of the conductive terminal 44 to the wind turbine's ground system.

Still referring to FIG. 5, each rotor blade 16 may include a single conductive circuit 60, as depicted, with each of the lightning receptors 40 configured in series within the single circuit 60. In an alternative embodiment, the rotor blade 16 may include a plurality of circuits 60, with each of the lightning receptors 40 configured in one of the respective circuits 60. In still further embodiments, the receptors 40 may be connected in any suitable fashion via the conductor 41 and it should be understood that the embodiment of FIG. 5 is provided for example purposes only and is not intended to be limiting.

Referring now to FIG. 6, a schematic diagram of one embodiment of various internal components of the lightning protection system 50 according to the present disclosure is illustrated. More particularly, FIG. 6 illustrates the location of the conductor 41 near the blade root 30 as well as the location of the conductor near the blade tip 32. As shown, the conductor 41 runs along a middle portion of the shear web 24 from the blade tip 30 until the shear web 24 ends near the blade root 30. In certain embodiments, once the shear web 24 ends, the conductor 41 runs along an edge of the shear web 24 to an inner surface 52 of the internal cavity 38 of the rotor blade 16 as shown in FIG. 7. Thus, in various embodiments, a cover assembly 54 is configured to receive at least a portion of the conductor 41 along a length thereof between the shear web 24 and the blade root 30. Accordingly, the cover assembly 54 is configured to maintain a location of the conductor 41 without requiring the conductor 41 to be secured directly to the rotor blade 16.

As such, the conductor 41 is free to move within the cover assembly 54 when installed. More specifically, as shown in FIG. 8, the cover assembly 54 defines an open passageway 56 configured to receive the conductor 41 therein. Thus, the cover assembly 54 is configured to maintain the location of the wire 41 along a surface of the rotor blade 16, while also allowing the wire 41 to freely move within the passageway since the wire 41 is not directly attached the rotor blade 16. In other words, the cover assembly 56, rather than the conductor 41, is attached to the rotor blade 16.

Referring back to FIG. 7, in certain embodiments, the cover assembly 54 may include one or more cover members 55 configured along the length of the conductor 41. More specifically, as shown, the cover assembly 54 includes four cover members 55. In further embodiments, the cover assembly 54 may include more than four or less than four cover members 55. Thus, the separate cover members 55 can be easily arranged along the length of the conductor 41, which may be straight in certain areas and angled in others. Further, the cover members 55 may include any suitable cross-sectional profile so as to receive the conductor 41 therein, including, but not limited to any of the following cross-sectional profiles: omega-shaped, square, elliptical, U-shaped, C-shaped, L-shaped, triangular, rectangular, round, or similar or any combinations thereof. For example, as shown in FIGS. 8, 10, and 11, the cover member 55 has a substantially omega-shaped cross section. Alternatively, as shown in FIG. 9, the cover member 55 may have a closed cross-section with a substantially arcuate shape.

In addition, as shown in FIGS. 12 and 13, the cover member 55 may have a multi-segmented configuration such that conductor 41 fits between the multiple segments to allow for easier insertion within the cover assembly 54. For example, as shown in FIG. 12, the cross-section of the cover member 55 includes two opposing generally C-shaped members that form an open passageway for the conductor 41 to fit therein. In another embodiment, as shown in FIG. 13, the cover members 55 may have a first member 63 and a second member 65. The first member 65 is attached or fixed to the rotor blade 16 and has an opening 66 configured to receive the conductor 41. Once the conductor 41 is placed within the opening 66, the second member 65 closes the cover member 55 such that the conductor 41 is maintained therein. As such, the second member 65 is movable whereas the first member 63 is fixed, thereby allowing the conductor 41 to be replaced and/or repaired whenever the second member 65 is removed. Further, as shown in FIG. 13, the cover members 55 may be configured along any portion of the shear web 24 or at any other suitable location within the rotor blade.

Referring generally to FIGS. 8-14, the cover assembly 54 may be attached to the rotor blade 16 using any suitable means. For example, as shown in FIGS. 8 and 10-13, the cover assembly 54 may be attached to the rotor blade 16 via one or more flanges 58. More specifically, the flanges 58 may be attached to the rotor blade 16 using any suitable attachment means. For example, as shown, the flanges 58 may be bonded to the rotor blade 16 with an adhesive 57. Alternatively, the flanges 58 may be attached to the rotor blade 16 via one or more fastening members (e.g. bolts, rivets, pins, etc.) or using any other suitable attachment means.

In still another embodiment, as shown in FIG. 9, the cover assembly 54 may not include any flanges, but may be attached to the rotor blade 16 via any suitable attachment means, such as an adhesive 57 (as shown) or one or more fastening members (not shown). Further, as shown in FIGS. 9 and 14, the cover assembly 54 may be secured to the rotor blade 16 via a bonding material 59 configured atop at least a portion of the cover assembly 54. More specifically, as shown in FIG. 14, the cover assembly 54 may include one or more openings 53 between the covers members 55 such that the cover assembly 54 may be attached to the shear web 24 using the bonding material 59 (e.g. glass or carbon fiber laminates) at the open locations. As such, the cover assembly 54 may be attached to the shear web 24 and the conductor 41 may thereafter be inserted therethrough. The bonding material 59 may include any suitable material, including but not limited to a laminate composite material, such as a carbon fiber reinforced laminate composite or a glass fiber reinforced laminate composite, an adhesive (e.g. tape or glue), or similar.

Referring to FIGS. 10 and 11, the cover assembly 54 may also include a dampening material 62. For example, as shown, the dampening material 62 may be configured between the portion of the conductor 41 within the passageway 56 of the cover assembly 54 and the rotor blade 16. More particularly, as shown in FIG. 10, the dampening material 62 may be configured within the open passageway 56 and attached to an inner surface of the rotor blade 16 within the passageway 56. Alternatively, as shown in FIG. 11, the dampening material 62 may be configured within the open passageway 56 and may also extend between the flanges 58 of the cover member 55 and the rotor blade 16. Thus, the dampening material 62 can provide dampening to both the conductor 41 and/or the cover member 55.

Referring now to FIG. 15, a flow diagram of a method 100 for installing a lightning protection system of a wind turbine is illustrated. As shown at 102, the method 100 includes securing a plurality of lightning receptors along either or both of a pressure side or a suction side of the rotor blade. At 104, the method 100 includes connecting the plurality of lightning receptors via at least one conductor so as to form a conductive circuit. At 106, the method 100 includes inserting the at least one conductor within a passageway of a cover assembly. At 108, the method 100 includes securing the cover assembly to an inner surface of an internal cavity of the rotor blade so as to maintain a location of the conductor, wherein the conductor is free to move within the cover assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine rotor blade, comprising:
   a root, a tip, and a pressure side and a suction side extending between said tip and said root, said pressure side and said suction side defining an internal cavity;
   a plurality of lightning receptors configured along either or both of said pressure side or said suction side;
   at least one conductor connected between the plurality of lightning receptors so as to form a conductive circuit; and,
   a cover assembly comprising a plurality of cover members, each cover member defining a passageway therethrough, the passageways receiving at least a portion of the conductor along a length thereof each of the cover members comprising opposing flanges on opposite sides of the passageway thereof the passageways of the cover members being open to an inner surface of the internal cavity, the opposing flanges attached to the inner surface of the internal cavity so as to maintain a location of the conductor adjacent to the inner surface of the internal cavity, wherein the conductor is free to move within the cover assembly.

2. The wind turbine rotor blade of claim 1, wherein the cover members comprise at least one of the following cross-sectional profiles: omega-shaped, square, U shaped, C-shaped, L-shaped, or rectangular.

3. The wind turbine rotor blade of claim 1, further comprising at least one of an adhesive or a fastener configured between the opposing flanges and the inner surface of the internal cavity.

4. The wind turbine rotor blade of claim 1, further comprising a bonding material configured atop the cover assembly.

5. The wind turbine rotor blade of claim 4, wherein the bonding material further comprises at least one of fiberglass laminates, an adhesive, or combinations thereof.

6. The wind turbine rotor blade of claim 1, wherein at least a portion of the conductor is configured with a shear web of the rotor blade.

7. The wind turbine rotor blade of claim 6, cover assembly is located between the blade root and an end of the shear web.

8. The wind turbine rotor blade of claim 1, wherein the cover assembly further comprises a dampening material configured between the portion of the conductor within the passageway of the cover assembly and the inner surface of the internal cavity of the rotor blade.

9. The wind turbine rotor blade of claim 1, wherein the cover assembly further comprises a dampening material configured between the cover members.

10. The wind turbine rotor blade of claim 1, wherein the conductive circuit further comprises terminal ends that extend through said root and connect to a grounding system.

11. A system for securing a conductor within a rotor blade of a wind turbine, the system comprising:
at least one conductor connected between a plurality of lightning receptors so as to form a conductive circuit; and,
a cover assembly comprising a plurality of cover members, each cover member defining a passageway therethrough, the passageways configured to receive at least a portion of the conductor along a length thereof, each of the cover members comprising opposing flanges on opposite sides of the passageway thereof, the passageways of the cover members being open to an inner surface of the internal cavity such that when the opposing flanges are attached to the inner surface of the rotor blade to maintain a location of the conductor, the conductor is free to move within the cover assembly.

12. The system of claim 11, wherein the cover members comprise at least one of the following cross-sectional profiles: omega-shaped, square, U-shaped, C-shaped, L-shaped, or rectangular.

13. The system of claim 11, wherein the opposing flanges are secured to the inner surface via at least one of an adhesive or a fastener.

14. The system of claim 11, further comprising a bonding material configured atop the cover assembly, wherein the bonding material further comprises at least one of fiberglass laminates, an adhesive, or combinations thereof.

15. The system of claim 11, wherein at least a portion of the conductor is configured with a shear web of the rotor blade, wherein the cover assembly is located between the blade root and an end of the shear web.

16. The system of claim 11, wherein the cover assembly further comprises a dampening material.

17. A method for installing a lightning protection system of a wind turbine, the method comprising:
securing a plurality of lightning receptors along either or both of a pressure side or a suction side of a rotor blade;
connecting the plurality of lightning receptors via at least one conductor so as to form a conductive circuit;
inserting the conductor within passageways of cover members of a cover assembly, each of the cover members comprising opposing flanges on opposite sides of the passageways; and,
securing the opposing flanges of the cover members to an inner surface of an internal cavity of the rotor blade with the passageways of the cover members being open to the inner surface of the internal cavity such that when the opposing flanges are secured to the inner surface, the conductor is free to move within the cover assembly.

* * * * *